(12) United States Patent
Weissenmayer et al.

(10) Patent No.: US 11,487,005 B2
(45) Date of Patent: Nov. 1, 2022

(54) METHOD AND DEVICE FOR IDENTIFYING A ROAD CONDITION

(71) Applicant: Robert Bosch GmbH, Stuttgart (DE)

(72) Inventors: Simon Weissenmayer, Flein (DE); Philipp Sauer, Tamm (DE); Christian Beer, Obersulm (DE); Timo Koenig, Unterheinriet (DE)

(73) Assignee: Robert Bosch GmbH, Stuttgart (DE)

( * ) Notice: Subject to any disclaimer, the term of this patent is extended or adjusted under 35 U.S.C. 154(b) by 184 days.

(21) Appl. No.: 17/040,514

(22) PCT Filed: Apr. 25, 2019

(86) PCT No.: PCT/EP2019/060632
§ 371 (c)(1),
(2) Date: Sep. 22, 2020

(87) PCT Pub. No.: WO2019/211167
PCT Pub. Date: Nov. 7, 2019

(65) Prior Publication Data
US 2021/0018618 A1    Jan. 21, 2021

(30) Foreign Application Priority Data
May 2, 2018    (DE) .......................... 102018206703.1

(51) Int. Cl.
*G01S 15/60*    (2006.01)
*G01S 15/86*    (2020.01)
(Continued)

(52) U.S. Cl.
CPC ............... *G01S 15/60* (2013.01); *G01S 7/411* (2013.01); *G01S 7/527* (2013.01); *G01S 7/539* (2013.01);
(Continued)

(58) Field of Classification Search
CPC .......... G01S 15/60; G01S 7/411; G01S 7/527; G01S 7/539; G01S 13/862; G01S 13/88;
(Continued)

(56) References Cited

U.S. PATENT DOCUMENTS 5,521,594 A    5/1996    Fukushima
2004/0204812 A1    10/2004    Tran
(Continued)

FOREIGN PATENT DOCUMENTS

| CN | 111016910 A | * | 4/2020 | ............ B60W 10/04 |
| CN | 112074755 A | * | 12/2020 | ............ G01S 15/52 |

(Continued)

OTHER PUBLICATIONS

Translation of JP2008033760 (Year: 2008).*
International Search Report for PCT/EP2019/060632, dated Oct. 10, 2019.

*Primary Examiner* — Daniel Pihulic
(74) *Attorney, Agent, or Firm* — Norton Rose Fulbright US LLP; Gerard Messina

(57) ABSTRACT

A method for identifying a road condition of a road. A piece of road condition information representing the road condition is determined using a noise level detected by at least one ultrasonic sensor of a vehicle and a bottom echo detected from a road surface in the area of the vehicle.

9 Claims, 1 Drawing Sheet

(51) Int. Cl.
*G01S 7/41* (2006.01)
*G01S 7/527* (2006.01)
*G01S 7/539* (2006.01)
*G01S 13/86* (2006.01)
*G01S 13/88* (2006.01)
*G01S 15/88* (2006.01)

(52) U.S. Cl.
CPC ............ *G01S 13/862* (2013.01); *G01S 13/88* (2013.01); *G01S 15/86* (2020.01); *G01S 15/88* (2013.01)

(58) Field of Classification Search
CPC .. G01S 15/86; G01S 15/88; G01S 2013/9323; G01S 15/931; G01S 7/537; G01S 7/4802
See application file for complete search history.

(56) References Cited

U.S. PATENT DOCUMENTS

| | | | |
|---|---|---|---|
| 2012/0167663 A1 | 7/2012 | Groitzsch et al. | |
| 2021/0018618 A1* | 1/2021 | Weissenmayer | G01S 15/88 |
| 2021/0055415 A1* | 2/2021 | Koenig | G01S 15/88 |
| 2021/0255296 A1* | 8/2021 | Weissenmayer | G01S 7/539 |

FOREIGN PATENT DOCUMENTS

| | | | | | |
|---|---|---|---|---|---|
| CN | 112074756 | A | * | 12/2020 | ............. G01B 17/08 |
| CN | 112074758 | A | * | 12/2020 | ............ G01S 13/862 |
| CN | 113119963 | A | * | 7/2021 | ............. B60Q 9/008 |
| CN | 109305165 | B | * | 4/2022 | ............. B60Q 9/008 |
| DE | 19843563 | A1 | | 3/2000 | |
| DE | 102008014513 | A1 | | 10/2008 | |
| DE | 102010027647 | A1 | | 1/2011 | |
| DE | 102011003334 | A1 | | 8/2012 | |
| DE | 102011085287 | A1 | | 5/2013 | |
| DE | 102015106401 | A1 | | 10/2016 | |
| DE | 102015106402 | A1 | | 10/2016 | |
| DE | 102016218238 | B3 | | 7/2017 | |
| DE | 102018203924 | A1 | * | 9/2019 | ............. G01S 13/08 |
| DE | 102018206700 | A1 | * | 11/2019 | ............. G01S 15/52 |
| DE | 102018206703 | A1 | * | 11/2019 | ........... G01S 13/862 |
| DE | 102018206722 | A1 | * | 11/2019 | ............. G01B 17/08 |
| DE | 102018206739 | A1 | * | 11/2019 | ............. G01S 15/60 |
| DE | 102018217325 | A1 | * | 4/2020 | ............. B60W 10/04 |
| DE | 102019208913 | A1 | * | 12/2020 | ............. B60W 40/06 |
| DE | 102019216729 | A1 | * | 5/2021 | |
| EP | 3788396 | A1 | * | 3/2021 | ............. G01S 15/52 |
| EP | 3788397 | A1 | * | 3/2021 | ............. G01B 17/08 |
| EP | 3788399 | A1 | * | 3/2021 | ............. G01S 13/862 |
| EP | 3788400 | A1 | * | 3/2021 | ............. G01S 15/60 |
| JP | 2008033760 | A | * | 2/2008 | ............. G01S 15/60 |
| WO | WO-2019211165 | A1 | * | 11/2019 | ............. G01S 15/52 |
| WO | WO-2019211167 | A1 | * | 11/2019 | ............. G01S 13/862 |
| WO | WO-2019211168 | A1 | * | 11/2019 | ............. G01B 17/08 |
| WO | WO-2019211169 | A1 | * | 11/2019 | ............. G01S 15/60 |

\* cited by examiner

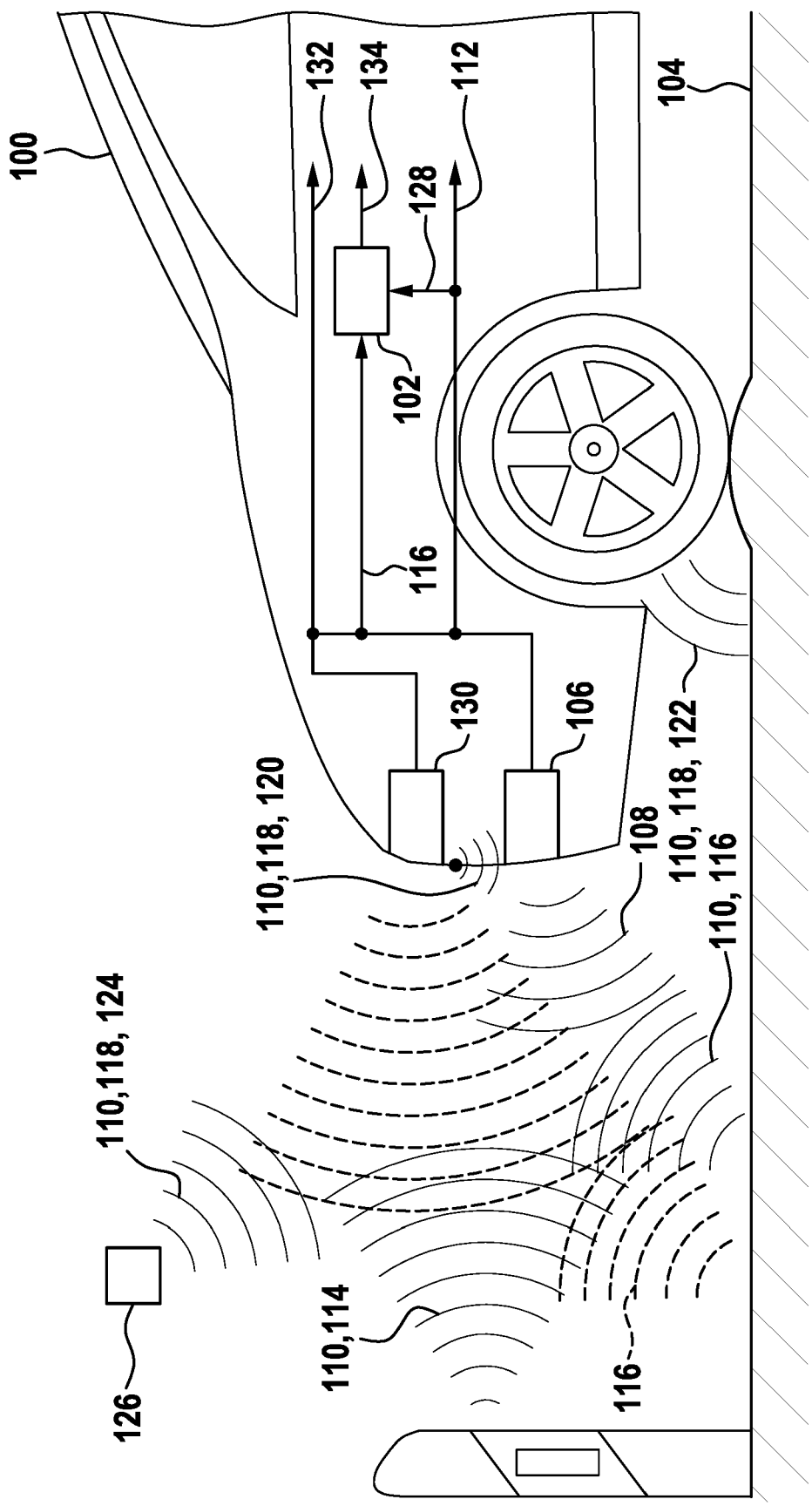

METHOD AND DEVICE FOR IDENTIFYING A ROAD CONDITION

FIELD

The present invention relates to a method and to a device for identifying a road condition.

BACKGROUND INFORMATION

A road condition influences significantly the road grip of a vehicle. The road condition is determined by, among other things, a form of a road surface and a condition of the road surface. For example, the road surface may be smooth or rough, dry, wet or covered in liquid. The road condition may, for example, be detected visually using a camera system of the vehicle.

SUMMARY

A method for identifying a road condition of a road, a device for identifying a road condition of a road, and a corresponding computer product and a machine-readable memory medium are provided in accordance with the present invention. Advantageous refinements of and improvements on example embodiments of the present invention are described herein.

Specific embodiments of the present invention may advantageously enable an identification of the road condition based on a noise level provided by an ultrasonic sensor of a vehicle to be ensured via a bottom echo provided by a sensor of the vehicle.

A method is provided for identifying a road condition of a road. In accordance with an example embodiment of the present invention, a piece of road condition information representing the road condition is determined using a noise level detected by at least one ultrasonic sensor of a vehicle and a bottom echo detected from a roadway surface in the area of the vehicle.

Features relating to specific embodiments of the present invention may be considered to be based on, among other things, the description below.

A road condition of a road may be understood to mean a surface structure of a surface of the road and/or a surface condition of the surface. The surface structure may be determined by a road pavement of the road. The road pavement may be smooth, rough and/or uneven. For example, the road pavement may be made of concrete or asphalt. The surface structure may then be smooth or rough. If, for example, the road pavement is made of cobblestone, the surface structure may be uneven but smooth or rough. The surface condition may, for example, be wet, dry, moist, muddy, snow-covered or flooded. The surface condition may be influenced by a contamination of the road.

A noise level reflects at least one sound volume of ambient noises at an ultrasonic sensor. The ambient noises may encompass wind noises originating at the host vehicle. The ambient noises may also encompass rolling noises resulting from the rolling of at least one tire of the vehicle on the road. The rolling noises are influenced significantly both by the surface structure of the road, as well as by the surface condition of the road. The ambient noises may also occur as a result of other vehicles, in this case wind noises and rolling noises of the other vehicle being able to be detected.

A bottom echo reflects the surface structure of the road as long as it is not hidden by the surface condition. The bottom echo may be referred to as clutter. The bottom echo is made up of multiple superimposed reflections of an actively emitted signal. The reflections form at small surfaces, which are part of the surface structure. The rougher the surface is, generally the more pronounced is the bottom echo. The bottom echo may be represented by a numerical value. The numerical value may be referred to as a clutter value.

The road condition information may be determined using a noise level change of the noise level and/or a bottom echo change of the bottom echo. The road condition may be identified by observing a noise level profile and/or a bottom echo profile. The road condition may be identified by a ratio or relative changes of the noise level and/or of the bottom echo.

A change of a surface of the road or of the roadway surface may be identified by the bottom echo change. A weather-related change of the road condition may be identified by the noise level change in conjunction with the bottom echo change. A noise source for extraneous noises may be identified by the noise level change. On a dry road, the noise level changes only little when changing from one road pavement to another road pavement, whereas the bottom echo may change significantly. A change from a dry road to a moist road significantly influences the noise level whereas the bottom echo shows little change. In a change to a flooded road, the noise level and the bottom echo change significantly. An extraneous noise does not change the bottom echo, whereas it is mapped in the noise level.

A profile of the noise level change and/or a profile of the bottom echo change may be observed over an observation time period in order to obtain the road condition information. The changes may be detected with a slight time delay. The sequence of the changes may be correctly assigned by an observation time period. The profile of the noise level change and/or the profile of the bottom echo change may, for example, be integrated upward in the observation time period.

The bottom echo may be detected using the ultrasonic sensor and/or using a radar sensor of the vehicle. The bottom echo may form as a result of reflections of sound waves and/or of radar waves at the road surface. The bottom echo may also be detected in parallel using both sensors.

The bottom echo may be detected up to a velocity upper limit using the ultrasonic sensor. A sound volume at the ultrasonic sensor increases with increasing velocity of the vehicle. With increasing velocity, the bottom echo may disappear in the ambient noise and be shifted as a result of the Doppler effect outside the detectable frequency range. At low velocities, the bottom echo exhibits a high resolution at the ultrasonic sensor. The bottom echo at the radar sensor is minimally influenced or not influenced by the velocity.

A change of a surface of the road or of the roadway surface may also be detected with the aid of an imaging method such as, for example, the use of a camera or of a LIDAR sensor. If the camera measures a change of the reflection strength of an external light source such as, for example, from road lighting or from the lighting of other vehicles, then this may be attributed to a change of the road surface. If the LIDAR sensor measures a change of the reflection strength of the reflection signal of the host-emitted light, then this may also be attributed to a change in the road surface. The identified change of the road surface may substitute the bottom echo.

The method may, for example, be implemented in software or in hardware or in a mixed form of software and hardware, for example, in a control unit.

The present invention further provides a device, which is designed to carry out, activate or implement the steps of one variant of the method presented herein in corresponding units.

The device may be an electrical device including at least one processing unit for processing signals or data, at least one memory unit for storing signals or data, and at least one interface and/or one communication interface for reading in or outputting data, which are embedded in a communication protocol. The processing unit may, for example, be a signal processor, a so-called system ASIC, or a microcontroller for processing sensor signals and for outputting data signals as a function of the sensor signals. The memory unit may, for example, be a flash memory, an EPROM or a magnetic memory unit. The interface may be designed as a sensor interface for reading in the sensor signals from a sensor and/or as an actuator interface for outputting the data signals and/or control signals to an actuator. The communication interface may be designed to read in or output data wirelessly and/or in a hard-wired manner. The interfaces may also be software modules, which are present, for example, on a microcontroller along with other software modules.

Also advantageous is a computer program product or computer program having program code, which may be stored on a machine-readable medium or memory medium, such as a semiconductor memory, a hard disk memory or an optical memory, and which is used for carrying out, implementing and/or activating the steps of the method according to one of the specific embodiments of the present invention described herein, in particular, when the program product or program is executed on a computer or a device.

It is noted that some of the possible features and advantages of the present invention are described herein with reference to different specific embodiments. Those skilled in the art recognize that the features of the method and of the device may be combined, adapted or exchanged in a suitable manner in order to arrive at further specific embodiments of the present invention.

BRIEF DESCRIPTION OF THE DRAWING

Specific embodiments of the present invention are described below with reference to the FIGURE, neither the FIGURE nor the description are to be interpreted as restricting the present invention.

FIG. 1 shows a representation of a vehicle including a device according to one exemplary embodiment of the present invention.

The FIGURES are merely schematic and not true to scale. Identical reference numerals in the FIGURES refer to identical or identically acting features.

DETAILED DESCRIPTION OF EXAMPLE EMBODIMENTS

FIG. 1 shows a representation of a vehicle 100 including a device 102 according to one exemplary embodiment. Device 102 is designed to carry out a method for identifying a road condition of a road 104 according to the approach presented herein. For this purpose, vehicle 100 includes at least one ultrasonic sensor 106. Ultrasonic sensor 106 emits ultrasound 108 and maps sound waves 110 arriving at ultrasonic sensor 106 in a received signal 112.

Sound waves 110 in this case include echoes 114 of ultrasound 108 at surfaces, which are oriented essentially transversely to a propagation direction of ultrasound 108. Since road 104 is oriented essentially in the propagation direction, road 104 is mapped as bottom echo 116 in sound waves 110. Bottom echo 116 forms at numerous small surfaces of a surface structure of road 104 oriented transversely to the propagation direction. The rougher road 104 is, the more pronounced is bottom echo 116. Bottom echo 116 is mapped in ultrasonic sensor 106 as a numerical value. The numerical value thus represents the surface structure.

Extraneous noises 118 are also mapped in received signal 112. Extraneous noises 118 are, for example, wind noises 120, rolling noises 122 and noises 124 from other noise sources 126. Ultrasonic sensor 106 maps an intensity of extraneous noises 118 as a further numerical value in a noise level 128. A surface condition of road 104 influences significantly rolling noise 122. If road 104 is wet, rolling noise 122 is louder than if road 104 is dry. Thus, noise level 128 is also higher on wet road 104 than on dry road 104.

In one exemplary embodiment of the present invention, vehicle 100 further includes a radar sensor 130. Radar waves of radar sensor 130 are also reflected at the surfaces, which are oriented essentially transversely to a propagation direction of the radar waves. The radar waves are also reflected at the numerous small surfaces of the surface structure of road 104 oriented transversely to the propagation direction and mapped in a radar signal 132 of radar sensor 130 as bottom echo 116. Extraneous noises 118 do not influence radar sensor 130.

Device 102 reads in noise level 128 from ultrasonic sensor 106 and bottom echo 116 from ultrasonic sensor 106 and/or from radar sensor 130 and determines a piece of road condition information 134 using noise level 128 and bottom echo 116. Road condition information 134 represents the road condition of road 104.

In one exemplary embodiment of the present invention, a relative change of the road condition is identified based on a profile of noise level 128 and/or of bottom echo 116. For example, bottom echo 116 may become weaker if water fills the uneven surfaces of road 104. At the same time, however, rolling noise 122 of the tires on increasingly wet road 104 increases. Based on decreasing bottom echo 116 with increasing noise level 128, it is possible to identify the road condition as wet. Bottom echo 116 may also change as a result of a smooth paving. In this case, however, rolling noise 122 changes only little. The change in paving may therefore be identified.

A wind velocity at ultrasonic sensor 106 may be used in order to raise or lower a transmitting frequency of ultrasonic sensor 106. By the raising or lowering, it is possible to compensate at least partially for a Doppler shift of bottom echo 116 and/or of other echoes 114 and to hold a receiving frequency of bottom echo 116 within a receiving frequency range of ultrasonic sensor 106.

In other words, an improvement of the road condition identification is presented by checking the plausibility of the clutter changes and noise level changes.

The road condition may be deduced based on the noise level of an ultrasonic sensor system. However, this type of measurement may be severely disrupted by ambient noises (for example, caused by other vehicles). Short-term interferences may be filtered out with the aid of a low-pass filter. In this case, short-term changes of the noise level are not easily identifiable.

With the approach presented herein in accordance with the present invention, the road condition identification becomes robust with respect to interferences. Rapid road condition changes may also be precisely identified in the process.

The temporal changes of the noise levels and of the roadway surface are initially calculated. If only the noise level changes, but the roadway surface remains the same, it may be assumed that an ultrasonic interference source (for example, from the vehicle in the opposite lane) is a cause of the change and not a change of the roadway condition. If the roadway surface changes but the noise level remains the same, it may then be assumed that a change of the roadway texture (for example, concrete instead of asphalt) is the cause thereof but not a change of the roadway condition (water, snow, etc. on the roadway). If, however, the roadway surface and the noise level together change at the same time in a proportion characteristic thereof, then these changes may be assigned to a change of the roadway condition.

The roadway surface may be determined from the bottom echo of the ultrasonic signal. The bottom echo may be quantified in a clutter value. The clutter value maps a diffuse echo of the roadway pavement. However, this diffuse echo is heavily overlaid by the noise of wind and water of the host vehicle and of the other vehicles. For this reason, the clutter value is corrected with the aid of the noise level so that the noise level has no influence on the clutter value. Since the diffuse echo is only very weak, it is possible only with great difficulty to measure the diffuse echo at high vehicle speeds and thus with large Doppler shifts, if the diffuse echo is received far removed from the natural frequency of the sensor. At very high speeds, the frequency may be pushed completely out of the measuring range of the sensor. For this reason, the frequency is raised or lowered during transmission of the signal far enough so that the frequency of the echo does not depart the measuring range of the sensor. It may also be emitted with less intensity if it is transmitted far outside the natural frequency. The attenuation of the diffuse echo of the roadway surface or of the clutter value as a function of the vehicle speed is also compensated for, so that a change of the vehicle speed with an unchanging roadway surface and unchanging roadway condition has no influence on the clutter value.

In the case of high noise levels (for example, caused by water on the road and high speeds), it is not possible to measure or possible to only insufficiently measure the clutter values with the aid of the ultrasonic sensor system. For this reason, it is also alternatively or additionally possible to resort to the clutter values of radar sensors. The clutter values of the radar sensors are similarly influenced by the roadway surface, since the wavelengths of radar and ultrasound differ only by single digit multiples. The clutter value of the radar may, however, better reflect the structure of the roadway surface, since the radar is not influenced by noise due to the airflow and wet hissing.

Since the absolute value of a roadway condition and not the change thereof is generally of interest, the changes of the roadway condition are integrated over time in order to calculate the absolute value. However, this absolute value deviates from reality since the start value at the beginning of the integration is unclear and major integration errors result over a longer period of time.

In order to eliminate the errors resulting from the missing start value and the integration, an absolute value of the roadway condition is initially calculated. In the further course of the calculation, the roadway condition is averaged over a longer period of time and in this way short-term changes or errors are filtered out, for example, with the aid of a PT1 element. Based on this absolute value, the short-term calculated differences from the integrated change calculations are added, as described above. So that the integrated change calculations do not cause permanent deviations, these DT1 are filtered.

$$S = PT1(f_1(v, \mu_{R,i}, \mu_C)) + DT1(f_2(v, \dot{\mu}_{R,i}, \dot{\mu}_C))$$

When calculating road condition S, the airflow velocity v is also always taken into account, since the airflow velocity has a significant influence on the noise level and on the clutter value.

The airflow velocities may be calculated from each of the sensor values and assuming all possible roadway conditions.

$$\mu_{Z,i} = f_Z(\mu_{R,i})$$

The road condition is deduced from multiple airflow velocities collectively, which yields a large number of advantages. Both methods may be combined by not directly calculating the change of the road condition based on noise levels $\mu_{R,i}$ and clutter values $\mu_C$, and their changes $\dot{\mu}_{R,i}, \dot{\mu}_C$, but by initially indirectly calculating the changes of the airflow velocities for each individual sensor and then calculating therefrom with the aid of the PT1 and DT1 filters the absolute airflow velocities.

$$\mu_{Z,i} = PT1(f_{1,Z,i}(\mu_{R,i}, \mu_C)) + DT1(f_{2,Z,i}(\mu_{R,i}, \dot{\mu}_{R,i}, \mu_C, \dot{\mu}_C))$$

The airflow velocities calculated and checked for plausibility in this manner are more robust with respect to interferences and, as a result, have a lower standard deviation from the outset. The airflow velocities calculated and checked for plausibility in this manner are simply drawn upon in addition to the directly calculated airflow velocities. The road condition and the wind speeds may also be better calculated as a result of the higher quality of the airflow velocity values checked for plausibility and as a result of the large number of airflow velocity values overall.

To improve the result still further, the associated deviations $$\sigma_{Z,i}^2 = g_Z(\sigma_{Z,i}^2, \mu_{R,i}, \dot{\mu}_{R,i}, \sigma_{C,i}^2, \mu_{C,i}, \dot{\mu}_C, i)$$

of the airflow velocities checked for plausibility are also calculated and taken into account in the fusion with the directly calculated airflow velocities. Whenever the change of the clutter value is not plausible for changing the noise level, the standard deviation for the calculated airflow velocity is then calculated higher than if clutter value changes and noise level changes are plausible relative to one another.

The measurement of the road condition becomes more robust, more exact and more dynamic. The road conditions, weather conditions and interference sources may be more clearly distinguished from one another. Short, moist, wet or flooded road sections may be more reliably identified. The tire condition or tread depth may be more clearly determined. Wind and wind direction may be more clearly determined.

Finally, it is noted that terms such as "having," "including," etc., do not exclude any other elements or steps and terms such as "one" do not exclude a plurality.

What is claimed is:

1. A method for identifying a road condition of a road, the method comprising the following steps:
    detecting a noise level using at least one ultrasonic sensor of a vehicle;
    detecting a bottom echo in an area of the vehicle; and
    determining a piece of road condition information representing the road condition using the noise level detected by the at least one ultrasonic sensor of the vehicle and the detected bottom echo, wherein a transmitting frequency of the at least one ultrasonic sensor is raised or lowered based on a wind velocity at the at least one ultrasonic sensor.

2. The method as recited in claim 1, wherein the road condition information is determined using a noise level change of the noise level and/or a bottom echo change of the bottom echo.

3. The method as recited in claim 2, wherein a change of the roadway surface is identified by the bottom echo change, a weather-related change of the road condition is identified by the noise level change in conjunction with the bottom echo change, and a noise source for extraneous noises is identified by the noise level change.

4. The method as recited in claim 2, wherein a profile of the noise level change and/or a profile of the bottom echo change is observed over an observation time period to obtain the road condition information.

5. The method as recited in claim 1, wherein the bottom echo is detected using the ultrasonic sensor and/or using a radar sensor of the vehicle.

6. The method as recited in claim 5, wherein the bottom echo is detected up to a velocity upper limit using the ultrasonic sensor.

7. A method for identifying a road condition of a road, the method comprising the following steps:
    determining a change of a roadway surface in an area of the vehicle using a camera and/or a LIDAR sensor;
    detecting a noise level using at least one ultrasonic sensor of the vehicle; and
    determining a piece of road condition information representing the road condition using the noise level detected by the at least one ultrasonic sensor of the vehicle and the determined change of the roadway surface,
    wherein a transmitting frequency of the at least one ultrasonic sensor is raised or lowered based on a wind velocity at the at least one ultrasonic sensor.

8. A device configured to identify a road condition of a road, the device configured to:
    detect a noise level using at least one ultrasonic sensor of a vehicle;
    detect a bottom echo in an area of the vehicle; and
    determine a piece of road condition information representing the road condition using the noise level detected by the at least one ultrasonic sensor of the vehicle and the detected bottom echo,
    wherein a transmitting frequency of the at least one ultrasonic sensor is raised or lowered based on a wind velocity at the at least one ultrasonic sensor.

9. A non-transitory machine-readable memory medium on which is stored a computer program for identifying a road condition of a road, the computer program, when executed by a computer, causing the computer to perform the following steps:
    detecting a noise level using at least one ultrasonic sensor of a vehicle;
    detecting a bottom echo in an area of the vehicle; and
    determining a piece of road condition information representing the road condition using the noise level detected by the at least one ultrasonic sensor of the vehicle and the detected bottom echo,
    wherein a transmitting frequency of the at least one ultrasonic sensor is raised or lowered based on a wind velocity at the at least one ultrasonic sensor.

* * * * *